United States Patent [19]

Ingle

[11] Patent Number: 5,855,291
[45] Date of Patent: Jan. 5, 1999

[54] VEHICLE CARGO RESTRAINER

[76] Inventor: Edward C. Ingle, 3124 Shelter Cove, Gainesville, Ga. 30506

[21] Appl. No.: 645,084

[22] Filed: May 13, 1996

[51] Int. Cl.⁶ ....................................................... B65D 7/24
[52] U.S. Cl. ............................. 220/6; 220/666; 220/720; 220/4.03
[58] Field of Search ................................... 220/69.2, 9.3, 220/666, 720, 4.03; 211/195, 12; 248/97, 99

[56] References Cited

U.S. PATENT DOCUMENTS

| | | | |
|---|---|---|---|
| 2,953,244 | 9/1960 | Phillips | 220/6 |
| 3,072,281 | 1/1963 | Reilly | 220/6 |
| 4,174,046 | 11/1979 | Atkins | 220/6 |
| 4,184,602 | 1/1980 | Moliard | 220/6 |
| 4,226,348 | 10/1980 | Dottor et al. | 224/42.42 |
| 4,498,598 | 2/1985 | Bag | 220/6 |
| 4,561,554 | 12/1985 | Swincicki | 220/4 |
| 5,234,116 | 8/1993 | Kristinsson et al. | 211/201 |
| 5,366,189 | 11/1994 | Thompson | 248/97 |
| 5,379,906 | 1/1995 | Levin et al. | 211/195 |

Primary Examiner—Joseph M. Moy

[57] ABSTRACT

Apparatus is provided for a safe, convenient and practical method of securing goods and packages inside a vehicle. The device comprises a generally rectangular, open storage facility which is collapsible to an approximately flat configuration. The device can be situated in various locations inside the vehicle, and can be easily stored in the trunk or under the seats when not in use. Two handles on either side of the device allow the same to be carried or readily moved within the vehicle. A generally flexible netting functions as an alternative base for the device, reducing the risk that fragile items would become loose and break or crack. The netting is also adapted to fit over the top of the device, preventing the escape of articles from open areas of vehicles such as a pick-up truck.

5 Claims, 4 Drawing Sheets

VEHICLE CARGO RESTRAINER

BACKGROUND OF THE INVENTION

1. Field of the Invention

The present invention relates to a vehicle cargo restrainer intended to secure a variety of articles during transportation. More specifically, the present invention provides a convenient restrainer, which may be positioned in various locations within a vehicle, that prevents articles, parcels and so forth from slipping or being dislodged during transportation.

2. Description of the Prior Art

A common dilemma experienced by the drivers of automobiles are the problems associated with the transport of various articles and parcels. Typically, these objects become dislodged during portage, and the contents normally spill into the vehicle's compartment. Fragile items such as glass, plastic and so forth occasionally break or crack, causing the stored fluids to leak. As a result, drivers frequently resort to various, oftentimes futile, methods of providing support to ensure said articles and packages are secure during transport. In no instance is this problem more acute than during trips to and from department stores and supermarkets, where packages of goods and valuables often overturn during the journey. Displaced articles can also be a danger to drivers, as well as an inconvenience, where displaced articles roll under the gas pedal or brake. The present invention ensures a measure of relief for frustrated drivers by providing a portable restraining means which can safely secure a variety of articles and packages. When not in use, the device collapses readily to be conveniently stored behind the seat of pick-up trucks, under the seats of vans and sport vehicles or in the trunk or designated storage area of other types of vehicles. For use, it opens easily into a large, stable restraining fence which rests on the floor of the vehicle wherever desired.

Numerous innovations for an vehicle cargo restrainer have been provided in the prior art that are described as follows. Even though these innovations may be suitable for the specific individual purposes to which they address, they differ from the present invention as hereinafter contrasted.

U.S. Pat. No. 4,226,348 to Dottor et al. discloses an automobile contained grocery bag holder that provides a storage means in the trunk of a vehicle. A plurality of storage compartments are secured to a solid base intended to prevent the escape of liquids. The device includes attachment meas that enable the device to be secured to the floor of the trunk of the vehicle. This patent differs from the present invention because the vehicle cargo restrainer provides at least two handles, one on either side of the device, which allow the same to be repositioned to various locations within the vehicle. Moreover, the vehicle cargo restrainer provides a flexible base for more cumbersome objects, this feature is not disclosed in the present patent. In addition, the vehicle cargo restrainer provides an open storage facility, allowing for the placement of larger objects, whereas the present invention comprises smaller, individual compartments.

U.S. Pat. No. 5,379,906 to Levin et al. provides a foldable organizer located in the automobile's trunk which includes a plurality of compartments for storage purposes. This patent differs from the present invention because two handles for carrying purposes is not disclosed. Further, a the present invention comprises a generally open storage basin, allowing for the storage a large articles. This feature is not disclosed in the present patent.

U.S. Pat. No. 5,366,189 to Thomson provides a support means for grocery bags. The device comprises two intersecting panel members that form four chambers within which said bags are secured. This patent differs from the present invention because the vehicle cargo restrainer comprises a generally rectangular storage means having four walls and a base. This features are not disclosed in the present patent.

U.S. Pat. No. 5,234,116 to Kristinsson et al. provides a collapsible rack assembly intended to secure packages and other parcels. This patent differs from the present invention because a generally rectangular storage means comprising four adjustable walls and a flexible base is not disclosed.

U.S. Pat. No. 4,561,554 to Swincicki discloses a container intended for the storage of produce and other goods. The present invention provides an open, generally rectangular storage basin with a flexible base. These features are not disclosed in the present patent.

Numerous innovations for an vehicle cargo restrainer have been provided in the prior art that are adapted to be used. Even though these innovations may be suitable for the specific individual purposes to which they address, they would not be suitable for the purposes of the present invention as heretofore described.

SUMMARY OF THE INVENTION

In accordance with the present invention, a vehicle cargo restrainer comprises a generally rectangular, open storage fence which is preferably manufactured from plastic or plastic composite. The device may also be manufactured from rubber, wood, metal or metal alloy. The two shorter sides of said invention each include a hand-hold opening, which enable the device to be carried or moved. The two longer sides comprise two independent segments, of approximately equal lengths, one being slidably housed directly inside the other. A hinge located on each of the four corners of said device pivotally attach each of the four sides to one another. A plurality of longitudinally disposed slats, equidistantly spaced and integrally attached to the sides of said device, form the bottom of the device. Said slats are preferably manufactured from plastic, but may also be manufactured from rubber and plastic composite. In alternative embodiments, the slats are basket woven to form a more solid, stable base for the storage of smaller objects or replaced by woven netting which may be easily and interchangeably attached to either the bottom or top of the device by means of provided attachment points. As disclosed hereinbefore, the vehicle cargo restrainer is collapsible by means of the four hinges, which cooperate with the two segments of each of the longer sides to allow the device to be reduced to a generally flat configuration.

Accordingly, it is an object of the present invention to provide a vehicle cargo restrainer which provides a storage means for packages, articles, and various other objects during vehicular usage.

More particularly, it is an object of the present invention to provide an vehicle cargo restrainer which prevents the escape or dislodging of articles from packages and various other containers stored within the vehicle cargo restrainer.

Another feature of the present invention is that the vehicle cargo restrainer is collapsible, allowing for easy storage of the same when not in use.

Yet another feature of the present invention is that the device can be placed in a variety of locations within the vehicle depending on the particular storage needs of the user.

Still yet another feature of the present invention is the flexible base, reducing the risk that fragile items such as glass and ceramic will be dislodged and possibly broken or cracked during travel.

Yet another feature of the present invention is the generally large size of the restraining means, allowing for the storage of cumbersome or otherwise bulky objects.

Still yet another feature of the present invention is the interchangeable netting which is easily repositionable to and from the top and bottom of the device, preventing the escape of articles from open areas of a vehicle, such as the rear of a pick-up truck, during travel.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—vehicle cargo restrainer (10)
12A—basin first member (12A)
12AL—basin first member left side (12AL)
12ALA—basin first member left border (12ALA)
12ALAA—basin first member left housing (12ALAA)
12ALAB—basin first member left edge (12ALAB)
12ALB—basin first member left hinge first bracket (12ALB)
12AM—basin first member front (12AM)
12AMA—basin first member front handle (12AMA)
12AML—basin first member front left hinge second bracket (12AML)
12AMR—basin first member right hinge second bracket (12AML)
12AR—basin first member right side (12AR)
12ARA—basin first member right border (12ARA)
12ARAA—basin first member right housing (12ARAA)
12ARAB—basin first member right edge (12ARAB)
12ARB—basin first member right hinge first bracket (12ARB)
12B—basin second member (12B)
12BL—basin second member left side (12BL)
12BLA—basin second member left border (12BLA)
12BLAA—basin second member left pin (12BLAA)
12BLAB—basin second member left edge (12BLAB)
12BLB—basin second member left hinge first bracket (12BLB)
12BM—basin second member front (12BM)
12BMA—basin second member front handle (12BMA)
12BML—basin second member front left hinge second bracket (12BML)
12BMR—basin second member right hinge second bracket (12BML)
12BR—basin second member right side (12BR)
12BRA—basin second member right border (12BRA)
12BRAA—basin second member right pin (12BRAA)
12BRAB—basin second member right edge (12BRAB)
12BRB—basin second member right hinge first bracket (12BRB)
12C—hinge peg (12C)
14A—basin first member slats (14A)
14B—basin second member slats (14B)
16—track assembly (16)
18—rolling means (18)

BRIEF DESCRIPTION OF THE PREFERRED EMBODIMENT

DETAILED DESCRIPTION OF THE PREFERRED EMBODIMENT

Figure 1:
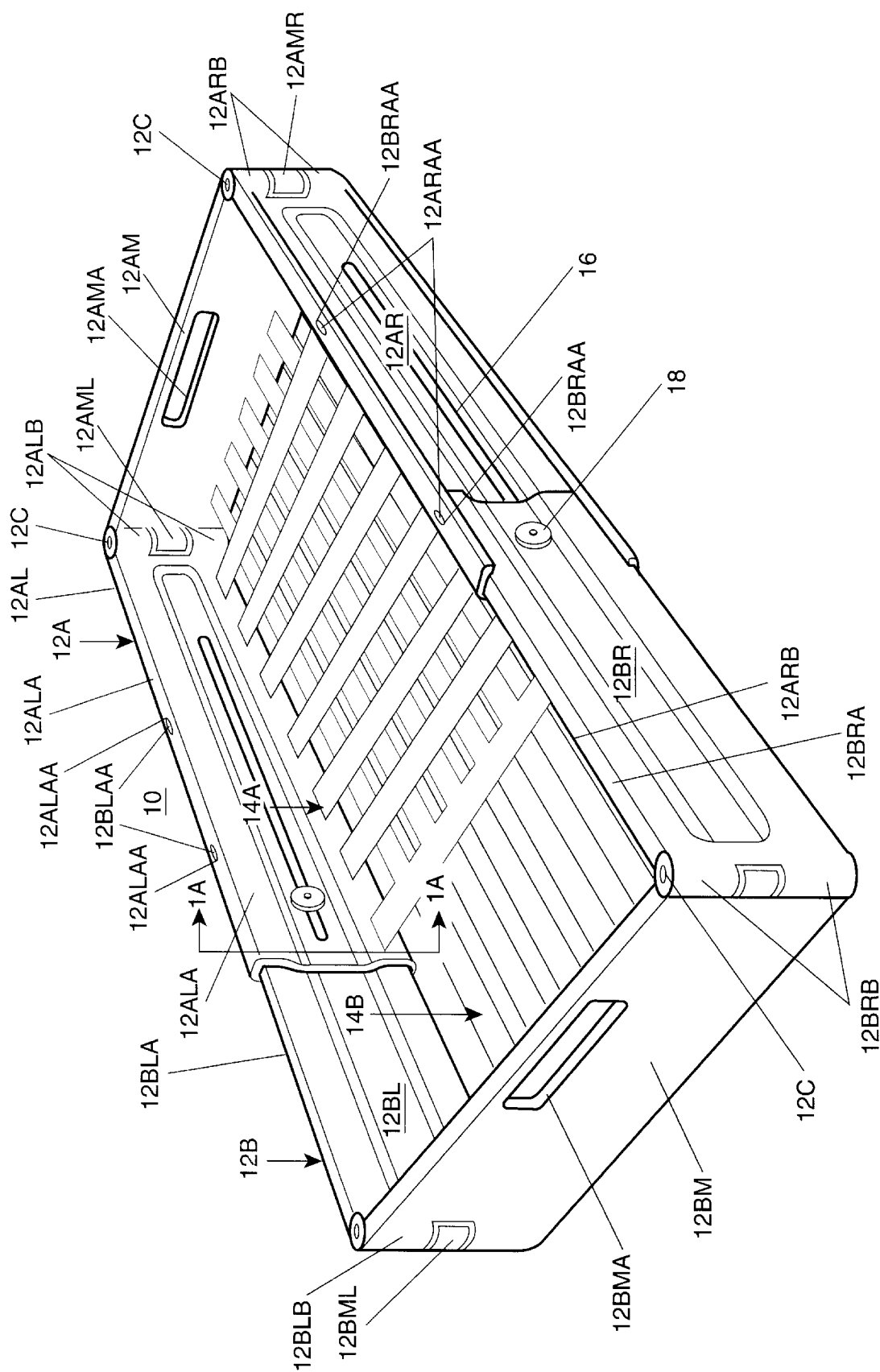
FIG. 1 is a top perspective view of the vehicle cargo restrainer.

Firstly, referring to FIG. 1 which is a is a top perspective view of the vehicle cargo restrainer (10) exhibiting the following features: basin first member (12A); basin first member left side (12AL); basin first member left border (12ALA); basin first member left housing (12ALAA); basin first member left edge (12ALAB); basin first member left hinge first bracket (12ALB); basin first member front (12AM); basin first member front handle (12AMA); basin first member front left hinge second bracket (12AML); basin first member right hinge second bracket (12AML); basin first member right side (12AR); basin first member right border (12ARA); basin first member right housing (12ARAA); basin first member right edge (12ARAB); basin first member right hinge first bracket (12ARB); basin second member (12B); basin second member left side (12BL); basin second member left border (12BLA); basin second member left pin (12BLAA); basin second member left edge (12BLAB); basin second member left hinge first bracket (12BLB); basin second member front (12BM); basin second member front handle (12BMA); basin second member front left hinge second bracket (12BML); basin second member right hinge second bracket (12BML); basin second member right side (12BR); basin second member right border (12BRA); basin second member right pin (12BRAA); basin second member right edge (12BRAB); basin second member right hinge first bracket (12BRB); hinge peg (12C); basin first member slats (14A); basin second member slats (14B); track assembly (16); and rolling means (18). The vehicle cargo restrainer (10) comprises a basin first member (12A) having a basin first member left side (12AL) and a basin first member right side (12AR) pivotally attached to a basin first member front (12AM). A basin first member left front hinge second bracket (12AML) and a basin first member right front hinge second bracket (12AMR) are pivotally mounted to a basin first member left hinge first bracket (12ALB) and a basin first member right hinge first bracket (12ARB), respectively, by means of two hinge pegs (12C) inserted therein. The basin first member (12A) further has a basin first member front handle (12AMA) hollowed through the basin first member front (12AM). The basin first member left side (12AL) further comprises a perpendicularly disposed basin first member left border (12ALA) on either end of said basin first member left side (12AL) and a basin first member left edge (12ALAB) which is perpendicularly disposed from the basin first member left border (12ALA), forming a hollow channel. At least two basin first member left housings (12ALAA) are bored through the basin first member left border (12ALA). The basin first member right side (12AR) further comprises a perpendicularly disposed basin first member right border (12ARA) on either end of said basin first member right side (12AR) and a basin first member right edge (12ARAB) which is perpendicularly disposed from the basin first member right border (12ARA), forming a hollow channel. At least two basin first member right housings (12ARAA) are bored through the basin first member right border (12ARA).

The basin first member (12A) further comprises a plurality of basin first member slats (14A) longitudinally disposed across the length of the basin first member (12A). The plurality of basin first member slats (14A) are equally spaced from another and are integrally attached to the basin first member right side (12AR) and the basin first member left side (12AL). In an alternative embodiment, the plurality of basin first member slats (14A) are both longitudinally and latitudinally disposed along the length of the basin first member (12A), forming a basket woven base for the vehicle cargo restrainer (10).

The vehicle cargo restrainer (10) further comprises a basin second member (12B) having a basin second member left side (12BL) and a basin second member right side (12BR) pivotally attached to a basin second member front (12BM). A basin second member left front hinge second bracket (12BML) and a basin second member right front hinge second bracket (12BMR) are pivotally mounted to a basin second member left hinge first bracket (12BLB) and a basin second member right hinge first bracket (12BRB), respectively, by means of two hinge pegs (12C) inserted therein. The basin second member (12B) further has a basin second member front handle (12BMA) hollowed through the basin second member front (12BM). The basin second member left side (12BL) further comprises a perpendicularly disposed basin second member left border (12BLA) on either end of said basin second member left side (12BL) and a basin second member left edge (12BLAB) which is perpendicularly disposed from the basin second member left border (12BLA), forming a hollow channel. At least two basin second member left pins (12BLAA), retractably attached to the upper basin second member left border (12BLA), extend upwardly from the basin second member left border (12BLA). The basin second member right side (12BR) further comprises a perpendicularly disposed basin second member right border (12BRA) on either end of said basin second member right side (12BR) and a basin second member right edge (12BRAB) which is perpendicularly disposed from the basin second member right border (12BRA), forming a hollow channel. At least two basin second member right pins (12BRAA), retractably attached to the upper basin second member right border (12BRA), project upwardly from the upper basin second member right border (12BRA).

The basin second member (12B) further comprises a plurality of basin second member slats (14B) longitudinally disposed across the length of the basin second member (12B). The plurality of basin second member slats (14B) are equally spaced from another and are integrally attached to the basin second member right side (12BR) and the basin second member left side (12BL). In an alternative embodiment, the plurality of basin second member slats (14B) are both longitudinally and latitudinally disposed along the length of the basin second member (12B), forming a basket woven base for the vehicle cargo restrainer (10).

Figure 1A:
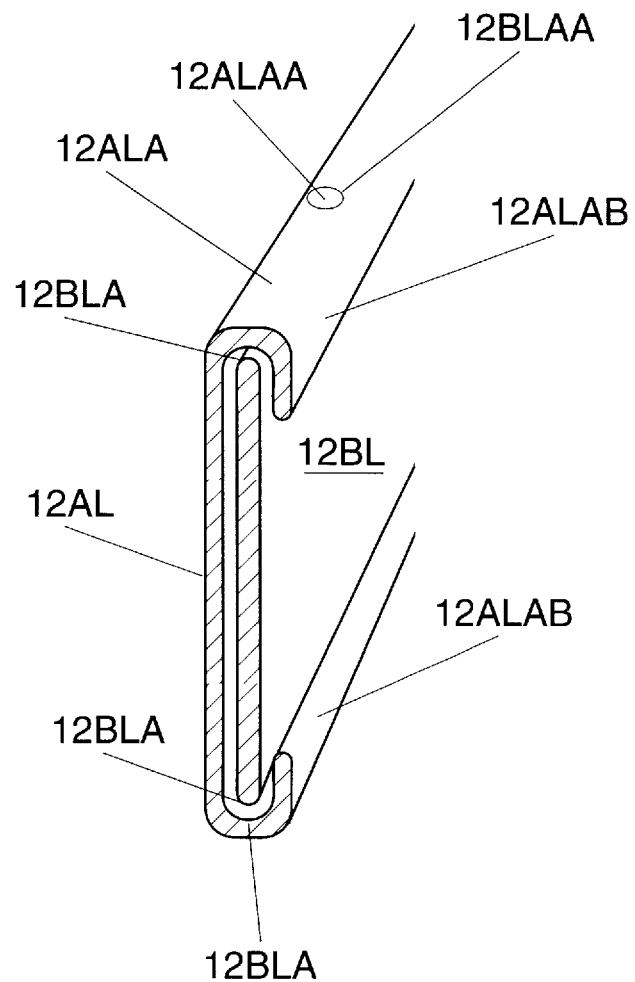
FIG. 1a is a side perspective view of the basin first and second members.

Now, referring to FIG. 1a which is a side perspective view of the basin first member (12A) and the basin second member (12B). The basin second member (12B) is slidably housed within the basin first member (12A). A track assembly (16) horizontally displaced along the length of the basin first member left side (12AL) and the basin first member right side (12AR) comprises a slot through which a rolling means (18) is inserted. The rolling means is rotatably mounted to the basin second member left side (12AL) and the basin second member right side (12AR), and cooperates with the track assembly (16) to permit the movement of the of the basin first member (12A) within the basin second member (12B). The basin second member (12B) is prevented from escaping the basin first member (12A) by means of the basin second member left pins (12BLAA) and the basin second member right pins (12BRAA) which extend through the basin first member left housings (12ALAA) and the basin second member right housings (12ARAA), respectively.

Figure 2:
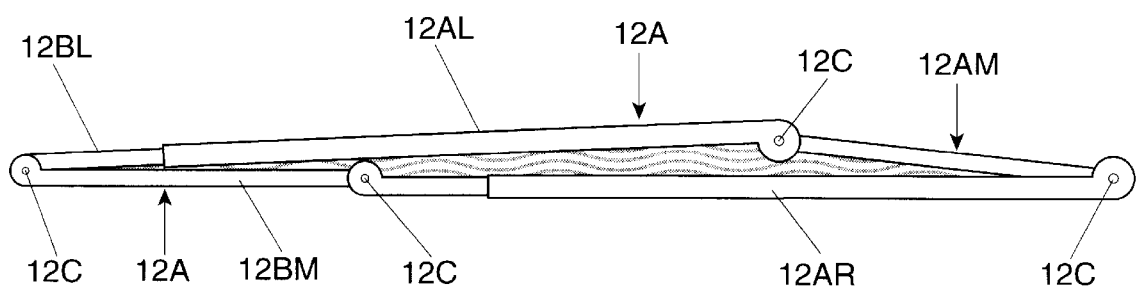
FIG. 2 is a top perspective view of the vehicle cargo restrainer in a collapsible position.

Now referring to FIG. 2 which is a top perspective view of the vehicle cargo restrainer (10) displayed in a collapsible position. As discussed hereinbefore, each side of the device is pivotally connected be means of bracket assemblies situated on each of the four corners of the vehicle cargo restrainer (10). When the vehicle cargo restrainer (10) is in use, the device forms a generally rectangular or square configuration. When not in use, the device is collapsible to a generally flat configuration, enabling the vehicle cargo restrainer (10) to be easily stored in the trunk or under the seats of a vehicle.

Figure 3:
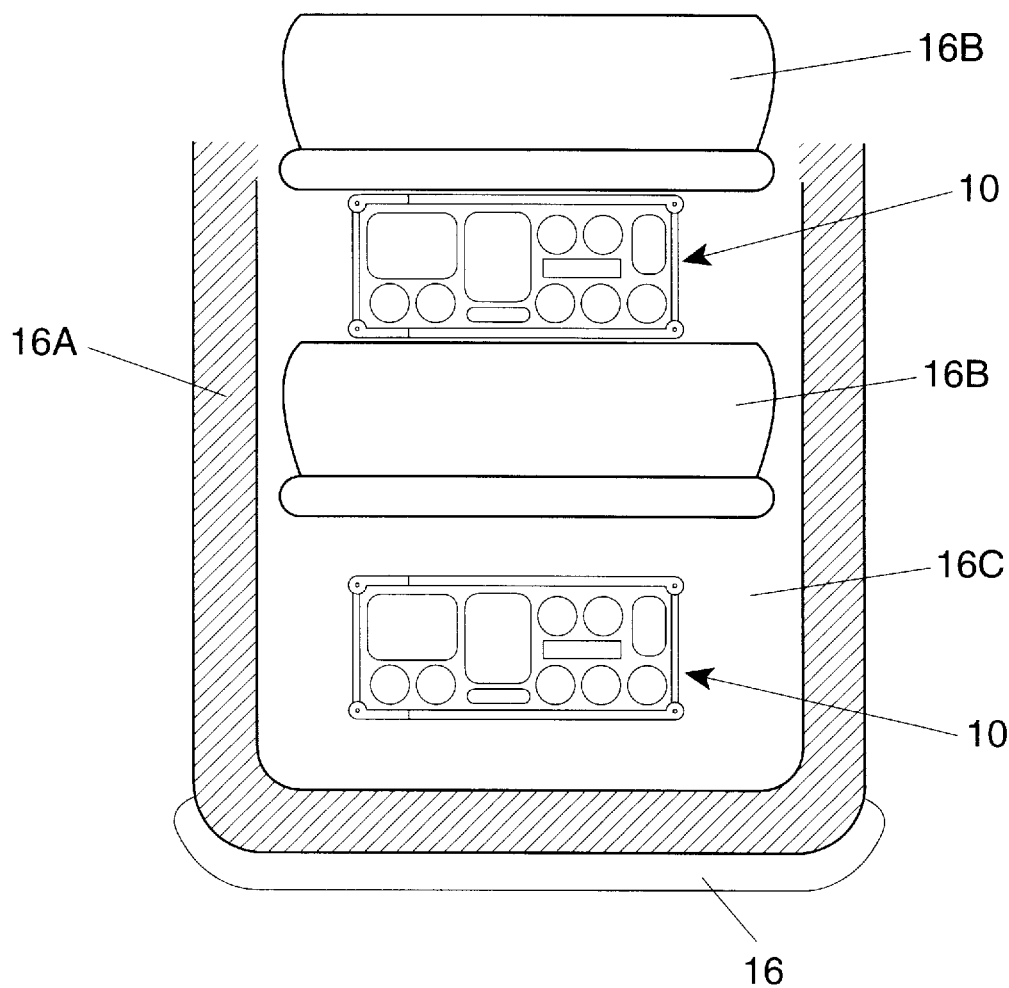
FIG. 3 is a top view of the vehicle cargo restrainer inside a vehicle.

Now referring to FIG. 3 which is a top view of the vehicle cargo restrainer (10) inside a vehicle. Because of the portable nature of the vehicle cargo restrainer (10), the device can be situated in various locations inside a vehicle.

It will be understood that each of the elements described above, or two or more together, may also find a useful application in other types of constructions differing from the type described above.

While the invention has been illustrated and described as embodied in a vehicle cargo restrainer, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A vehicle cargo restrainer (10) comprising:

a) a basin first member (12A) comprises a basin first member left side (12AL) and a basin first member right side (12AR) pivotally connected to a basin first member front (12AM), the basin first member left side (12AL) and the basin first member right side (12AR) further comprise a basin first member left border (12ALA) and a basin first member right border (12ARA), respectively, projecting inwardly on either end, the basin first member left border (12ALA) and the basin first member right border (12ARA) further comprise a basin first member left edge (12ALAB) and a basin first member right edge (12ARAB), projecting further inwardly, the vehicle cargo restrainer further comprises at least one basin first member left housing (12ALAA) and at least one basin first member right housing (12ARAA) hollowed through the upper basin first member left border (12ALA) and the basin first member right border (12ARA), respectively;

b) a basin second member (12B) which comprises a basin second member left side (12BL) and a basin second member right side (12BR) pivotally connected to a basin second member front (12BM), the basin second member left side (12BL) and the basin second member right side (12BR) further comprise a basin second member left border (12BLA) and a basin second member right border (12BRA), respectively, projecting inwardly on either end, the basin second member left border (12BLA) and the basin second member right border (12BRA) further comprises a basin second member left edge (12BLAB) and a basin second member right edge (12BRAB), projecting further inwardly, the vehicle cargo restrainer (10) further comprises at least one basin second member left housing (12BLAA) and at least one basin second member right housing (12BRAA) hollowed through the upper basin second member left border (12BLA) and the basin second member right border (12BRA), respectively;

c) each of the four corners of the vehicle cargo restrainer (10) have a bracket assembly which comprises a basin first member left hinge first bracket (12ALB) and a basin first member front left hinge second bracket (12AML), a basin first member right hinge second bracket (12AML) and a basin first member right hinge first bracket (12ARB), a basin second member left hinge first bracket (12BLB) and a basin second member front left hinge second bracket (12BML), a basin second member right hinge second bracket (12BML) and a basin second member right hinge first bracket (12BRB), each of the bracket assemblies further having a hinge peg (12C) inserted therein; and d) a basin first member front handle (12AMA) and a basin second member front handle (12BMA) are hollowed through the basin first member front (12AM) and the basin second member front (12BM), respectively, the vehicle cargo restrainer (10) further comprises a plurality of basin first member slats (14A) longitudinally displaced along the length of the basin first member (12A) and a plurality of basin second member slats (14B) longitudinally displaced along the length of the basin second member (12B), at least one basin second member left pin (12BLAA) and at least one basin second member right pin (12BRAA) are retractably mounted on the basin second member left border (12BLA) and the basin second member right border (12BRA) and project through the at least one basin first member left housing (12ALAA) and at least one basin first member right housing (12ARAA).

2. The vehicle cargo restrainer (10) as described in claim 1, wherein the basin second member (12B) is slidably housed within the basin first member (12A), and is manipulated back and forth by means of a track assembly (16) integrally attached to the basin first member left side (12AL) and the basin first member right side (12AR), the track assembly (16) further comprises guided by a roller means which is rotatably mounted to the basin second member left side (12AL) and the basin second member right side (12AR).

3. The vehicle cargo restrainer (10) as described in claim 1, wherein the device is manufactured from a group of materials consisting of plastic, plastic composite, rubber, wood, metal and metal alloy.

4. The vehicle cargo restrainer (10) as described in claim 1, wherein the device is collapsible to a generally flat configuration.

5. The vehicle cargo restrainer (10) as described in claim 1, wherein the at least one basin second member left pin (12BLAA) and the at least one basin second member right pin (12BRAA) are retractable to allow movement between the basin first member (12A) and the basin second member (12B).

* * * * *